J. M. YATER.
CUTTING TOOL.
APPLICATION FILED APR. 5, 1920.
1,375,342.
Patented Apr. 19, 1921.
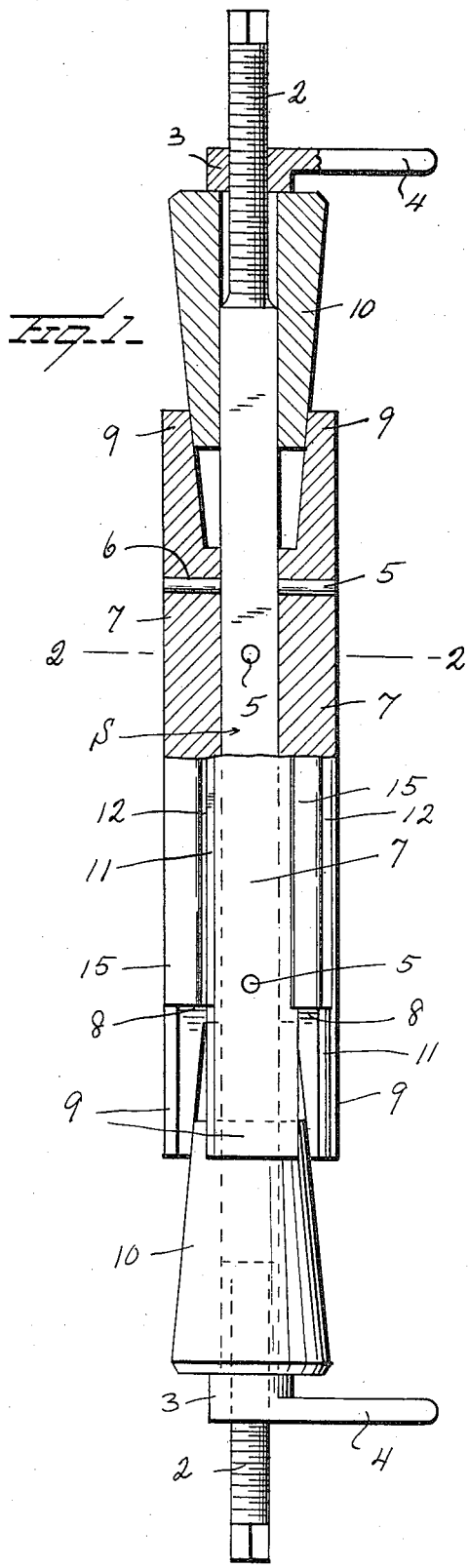
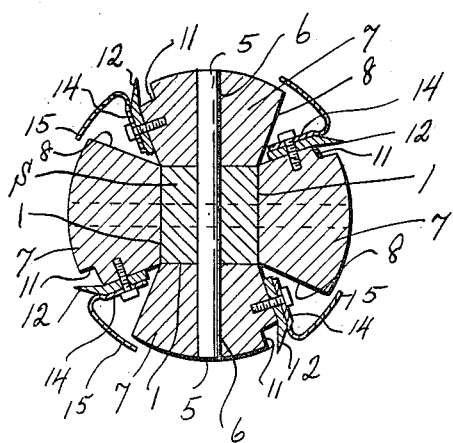
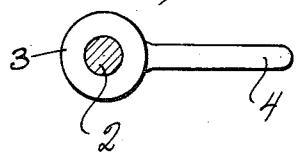
Inventor
J. M. Yater
By Watson E. Coleman
Attorney

UNITED STATES PATENT OFFICE.

JAMES M. YATER, OF NOWATA, OKLAHOMA.

CUTTING-TOOL.

1,375,342.  Specification of Letters Patent.  Patented Apr. 19, 1921.

Application filed April 5, 1920. Serial No. 371,564.

*To all whom it may concern:*

Be it known that I, JAMES M. YATER, a citizen of the United States, residing at Nowata, in the county of Nowata and State of Oklahoma, have invented certain new and useful Improvements in Cutting-Tools, of which the following is a specification, reference being had to the accompanying drawings.

This invention relates to certain improvements in cutting tools, and it is an object of the invention to provide a novel and improved device of this general character especially designed and adapted for use in connection with bearings and preferably of bearings comprised in an automobile or kindred devices.

Another object of the invention is to provide a device of this general character embodying a plurality of cutting members and wherein means coact therewith to effect a substantially radial adjustment of said cutting members in order to facilitate the desired working operation of the tool.

The invention consists in the details of construction and in the combination and arrangement of the several parts of my improved tool whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in elevation and partly in section of a tool constructed in accordance with an embodiment of my invention;

Fig. 2 is a sectional view taken substantially on the line 2—2 of Fig. 1; and

Fig. 3 is a view partly in section and partly in elevation, illustrating the sleeve or nut coacting with a spindle of the shaft or elongated member.

As herein disclosed, my improved tool comprises an elongated shaft or body S, angular in cross section and preferably square in cross section to provide four flat faces 1. The opposite end portions of the shaft or body S are provided with the outstanding spindles 2. Each of the spindles 2 has in threaded engagement therewith a collar or nut 3 provided with an outstanding arm or finger 4 to facilitate the requisite rotation of said collar or nut 3 when it is desired to adjust the same longitudinally of its spindle 2. Each flat face 1 has extending outwardly therefrom and at substantially right angles a pair of longitudinally spaced pins or studs 5 and which are adapted to seat within suitably positioned openings 6 formed in an elongated member or block 7. The longitudinal edges or sides of each of the members or blocks 7 are disposed on an inward bevel, as indicated at 8, and each end portion of said block or member 7 is provided with an outstanding and longitudinally directed extension 9, having its under face disposed inwardly on a predetermined bevel or incline. Loosely mounted upon the opposite end portions of the shaft S but capable of movement endwise thereof are the tapered sleeves 10 having their smaller ends inwardly directed. The sleeves underlie the extensions 9 so that when said sleeves are forced inwardly, the block or member 7 is forced outwardly. In other words, each of the sleeves 10 constitutes an expanding member and is common to all of the blocks or members 7. The upper marginal portion of one side face of each of the blocks or members 7 is cut-away to provide a rabbet 11 and secured to said side face below the rabbet 11 is the lower longitudinal marginal portion of a cutting blade 12. The cutting blade 12 is of material length and extends longitudinally of the block or member 7. Secured to the outer face of the cutting blade 12 and extending longitudinally thereof and substantially the entire length of said blade is a spring plate 14, having its outer or free longitudinal marginal portion provided with an outstanding flange 15 whereby the resiliency of said spring plate is materially increased.

My improved tool is particularly adapted for use in the truing or relining of bearings. After the device has been properly arranged within a bearing, the sleeves 10 are properly adjusted or moved inwardly through the instrumentality of the collars or nuts 3 to cause the cutting blades 12, carried by the blocks or members 7, to properly engage the work. The spring plates 14 operate to assure the tool to be effectively held by friction within the bearing so that the use of the tool is materially facilitated. Should a cutting blade become unduly worn or otherwise unfit for use, the block or member 7 to which it is secured may be readily removed and replaced with a block or member having a proper cutting blade.

From the foregoing description, it is thought to be obvious that a tool constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. A tool of the class described comprising an elongated member, outstanding pins carried by the member, said pins comprising a series of pairs with the pins of one pair spaced longitudinally of the member, a block coacting with each pair of pins and provided with openings into which said pins extend, expanding members engaged with the elongated member adjacent the opposite ends of the blocks, said expanding members forcing the blocks outwardly upon movement inwardly of the elongated member, and cutting blades carried by each of the blocks.

2. A tool of the class described comprising an elongated member, outstanding pins carried by the member, said pins comprising a series of pairs with the pins of one pair spaced longitudinally of the member, a block coacting with each pair of pins and provided with openings into which said pins extend, expanding members engaged with the elongated member adjacent the opposite ends of the blocks, said expanding members forcing the blocks outwardly upon movement inwardly of the elongated member, cutting blades carried by each of the blocks, said expanding members being loosely mounted on the elongated member, and collars threaded upon the elongated member outwardly of the expanding members and contacting therewith upon rotation in one direction to force said expanding members inwardly.

3. A tool of the class described embodying a block, a cutting blade secured to a face of the block, and a spring plate secured to said blade to provide positioning means.

4. A tool of the class described embodying a block, a cutting blade secured to a face of the block, and a spring plate secured to said blade, said plate having a marginal portion extending outwardly to provide a flange, said plate and flange providing positioning means.

5. A tool of the class described embodying a block, a cutting blade secured to a face of the block, and a spring plate secured to said blade to provide positioning means, said plate extending longitudinally of and substantially along the entire length of said blade.

6. A tool of the class described embodying a block, a cutting blade secured to a face of the block, and a spring plate secured to said blade to provide positioning means, said plate extending longitudinally of and substantially along the entire length of said blade, the outer longitudinal marginal portion of the plate being provided with a flange extending in a direction away from the plate.

In testimony whereof I hereunto affix my signature.

JAMES M. YATER.